N. G. HUGHES.
Fruit Picker.
No. 80,864. Patented Aug. 11, 1868.
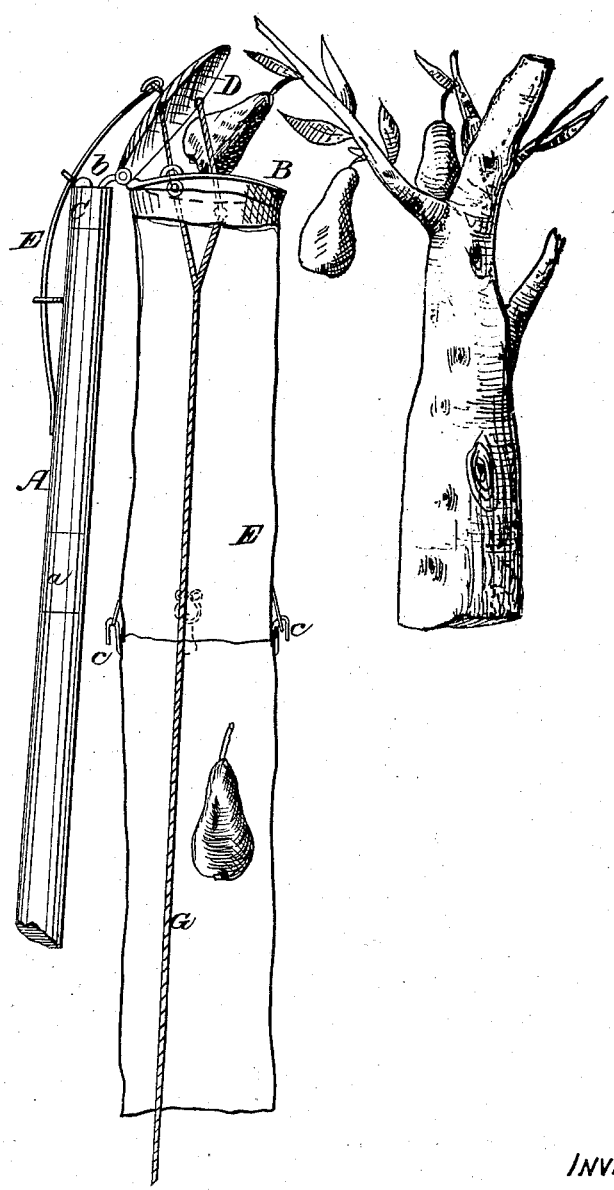

United States Patent Office.

N. G. HUGHES, OF WAYNESBURG, PENNSYLVANIA, ASSIGNOR TO HIMSELF AND THOMAS BRADEN, OF THE SAME PLACE.

Letters Patent No. 80,864, dated August 11, 1868.

IMPROVEMENT IN FRUIT-PICKER.

The Schedule referred to in these Letters Patent and making part of the same.

TO ALL WHOM IT MAY CONCERN:

Be it known that I, N. G. HUGHES, of Waynesburg, in the county of Greene, and State of Pennsylvania, have invented a new and useful Improvement in a Device for Picking Fruit; and I do hereby declare that the following is a full, clear, and exact description thereof, which will enable others skilled in the art to make and use the same, reference being had to the accompanying drawing, forming part of this specification, in which—

The drawing represents a perspective view of my invention, partly in section.

Similar letters of reference indicate like parts.

This invention relates to a new and improved device for picking fruit, and it consists in a novel construction of the implement, as hereinafter fully shown and described, whereby fruit may be picked from a tree with the greatest facility.

A represents a pole, made in sections, connected by joints $a$. This pole is of wood, and to its upper end there is attached an iron ring, B, the latter being provided with a tang, $b$, curved or bent downward, to drive into the end of the pole, which is prevented from splitting by means of a ferrule, C.

D is a lid or cover for the ring B, the former being connected to the tang $b$, by a suitable joint, which will admit of D rising and falling freely. This lid or cover has the upper end of a spring, E, attached to it, which spring is secured to the pole A, and has a tendency to keep the lid or cover D in a raised position.

F represents a hose, constructed of canvas, or any suitable fabric. This hose is made in sections, connected together by hooks and eyes, $c$, as shown clearly in the drawing. The upper end of this hose is securely sewed to the ring B.

G is a cord, which passes up through the hose F, and is attached to the lid or cover D, and is designed for drawing the latter down, in order to pluck or pick off the fruit from the tree, the fruit passing down the hose F, the lower end of which may be held in such a manner, by the person using the device, that the fruit cannot drop out upon the ground and be bruised, but be deposited in a basket or sack, without receiving any injury whatever.

The pole, A, is held in the left hand of the operator, while the lower end of the hose, and the cord G, are held in the right hand, the device being adjusted so that the apple, pear, or other large fruit to be picked, may be between the open lid or cover D and the ring B, and then, by pulling the cord G, the lid or cover D brought down and the fruit plucked, which will fall down the hose to the right hand of the operator. The cord G, in consequence of passing up through the hose F, is prevented from catching into the branches of the trees.

A greater or less number of sections may be used in the pole and hose, according to the length required.

Having thus described my invention, I claim as new, and desire to secure by Letters Patent—

The lid or cover D, spring E, ring B, hose F, and cord G, constructed and arranged as described, for the purpose specified.

The above specification of my invention signed by me, this 2d day of June, 1868.

N. G. HUGHES.

Witnesses:
   T. BRADEN,
   WM. T. E. WEBB.